(12) United States Patent
Kissa et al.

(10) Patent No.: US 7,522,784 B2
(45) Date of Patent: Apr. 21, 2009

(54) ASYMMETRIC DIRECTIONAL COUPLER HAVING A REDUCED DRIVE VOLTAGE

(75) Inventors: Karl Kissa, West Simsbury, CT (US); David Glassner, Ellington, CT (US)

(73) Assignee: JDS Uniphase Corporation, Milpitas, CA (US)

(*) Notice: Subject to any disclaimer, the term of this patent is extended or adjusted under 35 U.S.C. 154(b) by 0 days.

(21) Appl. No.: 11/673,097

(22) Filed: Feb. 9, 2007

(65) Prior Publication Data

US 2007/0201784 A1  Aug. 30, 2007

Related U.S. Application Data

(60) Provisional application No. 60/777,091, filed on Feb. 27, 2006.

(51) Int. Cl.
G02F 1/66 (2006.01)
G02B 6/26 (2006.01)

(52) U.S. Cl. .................................. 385/8; 385/40

(58) Field of Classification Search ............ 385/8, 385/40
See application file for complete search history.

(56) References Cited

U.S. PATENT DOCUMENTS

| | | | |
|---|---|---|---|
| 4,012,113 A | | 3/1977 | Kogelnik |
| 4,146,297 A | | 3/1979 | Alferness et al. |
| 4,384,760 A | * | 5/1983 | Alferness ............ 385/11 |
| 4,448,479 A | * | 5/1984 | Alferness ............ 385/3 |
| 4,618,210 A | | 10/1986 | Kondo |
| 4,644,145 A | * | 2/1987 | Gundner ............ 250/205 |
| 4,679,893 A | * | 7/1987 | Ramer ............ 385/9 |
| 4,820,009 A | * | 4/1989 | Thaniyavarn ............ 385/2 |
| 4,865,408 A | | 9/1989 | Korotky |
| 4,936,644 A | * | 6/1990 | Raskin et al. ............ 385/2 |
| 4,936,645 A | * | 6/1990 | Yoon et al. ............ 385/2 |
| 4,940,305 A | * | 7/1990 | Thaniyavarn ............ 385/16 |
| 5,048,906 A | * | 9/1991 | Okayama et al. ............ 385/40 |
| 5,074,631 A | * | 12/1991 | Hamano et al. ............ 385/3 |

(Continued)

OTHER PUBLICATIONS

Weissman et al, "Modes of Periodically Segmented Waveguides", Journal of Lightwave Technology, pp. 1831-1838, vol. 11, No. 11, Nov. 1993.

(Continued)

*Primary Examiner*—K. Cyrus Kianni
(74) *Attorney, Agent, or Firm*—Allen, Dyer, Doppelt Milbrath & Gilchrist, P.A.

(57) ABSTRACT

The invention relates to an electro-optic directional coupler suitable for use as a variable optical attenuator at reduced voltages compared to those known in the prior art. The present invention has found that by careful selection of an asymmetric directional coupler geometry, the transfer function of the device can be shifted so that it has an operating point between maximum and minimum transmission. Signal electrodes driven in push pull configuration advantageously use this operating point to achieve significant reduction in operating voltages for switching to maximum or minimum transmission. Asymmetry is created in the directional coupler by forming the waveguides to have different propagation constants by a difference in waveguide width, depth, index of refraction or index profile. Asymmetry can alternatively be created by causing mechanical stress in the waveguides through the placement, number, or dimensions of the electrodes, or through asymmetric dielectric structures between the waveguides and the electrodes.

14 Claims, 15 Drawing Sheets

U.S. PATENT DOCUMENTS

| | | | | |
|---|---|---|---|---|
| 5,075,793 | A * | 12/1991 | Schiffner | 398/203 |
| 5,125,065 | A * | 6/1992 | Stoll et al. | 385/130 |
| 5,185,830 | A * | 2/1993 | Nishimoto | 385/41 |
| 5,278,923 | A | 1/1994 | Nazarathy et al. | |
| 5,333,231 | A * | 7/1994 | Fukuda et al. | 385/122 |
| 5,375,180 | A * | 12/1994 | Murphy | 385/21 |
| 5,404,412 | A * | 4/1995 | Seino et al. | 385/2 |
| 5,481,636 | A * | 1/1996 | Fukuda et al. | 385/122 |
| 5,548,668 | A * | 8/1996 | Schaffner | 385/1 |
| 5,680,497 | A | 10/1997 | Seino et al. | |
| 5,970,186 | A * | 10/1999 | Kenney et al. | 385/16 |
| 6,195,191 | B1 | 2/2001 | Osenbach et al. | |
| 6,215,918 | B1 * | 4/2001 | Keil et al. | 385/16 |
| 6,236,772 | B1 * | 5/2001 | Tavlykaev et al. | 385/2 |
| 6,289,699 | B1 | 9/2001 | Kewitsch et al. | |
| 6,317,233 | B1 | 11/2001 | Son | |
| 6,374,018 | B1 * | 4/2002 | Okayama | 385/40 |
| 6,393,185 | B1 | 5/2002 | Deacon et al. | |
| 6,400,490 | B1 * | 6/2002 | Hosoi | 359/254 |
| 6,408,119 | B1 | 6/2002 | Meltz et al. | |
| 6,594,408 | B1 * | 7/2003 | Noe | 385/11 |
| 6,785,434 | B2 | 8/2004 | Castoldi et al. | |
| 6,839,491 | B2 * | 1/2005 | Painter et al. | 385/50 |
| 6,842,569 | B2 * | 1/2005 | Thaniyavarn | 385/41 |
| 6,845,183 | B2 * | 1/2005 | Cheung et al. | 385/2 |
| 6,928,212 | B2 * | 8/2005 | Kambe | 385/27 |
| 6,959,123 | B2 * | 10/2005 | Painter et al. | 385/1 |
| 6,999,671 | B2 * | 2/2006 | Painter et al. | 385/131 |
| 7,031,577 | B2 * | 4/2006 | Painter et al. | 385/50 |
| 7,130,509 | B2 * | 10/2006 | Painter et al. | 385/50 |
| 7,209,212 | B2 * | 4/2007 | Chuang et al. | 349/196 |
| 2002/0025103 | A1 * | 2/2002 | Thaniyavarn | 385/15 |
| 2002/0085811 | A1 * | 7/2002 | Kambe | 385/41 |
| 2002/0122615 | A1 * | 9/2002 | Painter et al. | 385/15 |
| 2002/0172464 | A1 * | 11/2002 | Delwala | 385/40 |
| 2003/0081902 | A1 * | 5/2003 | Blauvelt et al. | 385/50 |
| 2003/0147591 | A1 | 8/2003 | Masaharu et al. | |
| 2005/0013545 | A1 * | 1/2005 | Kambe | 385/41 |
| 2005/0135721 | A1 * | 6/2005 | Painter et al. | 385/1 |
| 2005/0135764 | A1 * | 6/2005 | Painter et al. | 385/129 |
| 2005/0207699 | A1 * | 9/2005 | Painter et al. | 385/32 |
| 2005/0213889 | A1 * | 9/2005 | Blauvelt et al. | 385/50 |
| 2005/0259923 | A1 | 11/2005 | Sriram et al. | |
| 2006/0039653 | A1 * | 2/2006 | Painter et al. | 385/50 |
| 2006/0120669 | A1 * | 6/2006 | Blauvelt et al. | 385/50 |
| 2007/0058896 | A1 * | 3/2007 | Toyoda et al. | 385/3 |
| 2007/0196042 | A1 * | 8/2007 | Little | 385/5 |

OTHER PUBLICATIONS

Bulow et al, "Design and Realization of an Integrated Optic Switch for Crossbar Switching Arrays", Journal of Lightwave Technology, pp. 2003-2008, vol. 7, No. 12, Dec. 1989.

Hanagawa et al, "Broad-Band High-Silica Optical Waveguide Star Coupler with Asymmetric Directional Couplers", Journal of Lightwave Technology, pp. 1292-1297, vol. 8 No. 9, Sep. 1990.

Takagi et al, "Design and Fabrication of Broad-Band Silica-Based Optical Waveguide Couplers with Asymmetric Structure", IEEE Journal of Quantum Electronics, pp. 848-855, vol. 28, No. 4, Apr. 1992.

* cited by examiner

ASYMMETRIC DIRECTIONAL COUPLER HAVING A REDUCED DRIVE VOLTAGE

CROSS-REFERENCE TO RELATED APPLICATIONS

This application claims priority from U.S. provisional application No. 60/777,091 filed Feb. 27, 2006, herein incorporated by reference for all purposes.

MICROFICHE APPENDIX

Not Applicable.

TECHNICAL FIELD

The present application relates to electro-optic directional couplers, particularly an asymmetric directional coupler having a reduced drive voltage.

BACKGROUND OF THE INVENTION

Directional couplers comprise two waveguides formed in electro-optic material such as lithium niobate, lithium tantalate or gallium arsenide for example, disposed in close proximity over a coupling length selected to enable evanescent coupling of 100% of the transmitted optical power from one waveguide to the other. An electric field created by a voltage applied through one or both waveguides alters the propagation constant of the waveguide due to the electro-optic effect of the substrate, resulting in a change in the percentage of coupling. Directional couplers are useful in optical switches, modulators and variable attenuators.

Directional couplers have been difficult to manufacture successfully for switching and related applications, in part because the manufacturing tolerances to achieve the proper coupling length and precise symmetry required have been commercially challenging, and in part because the wavelength range of the coupler has been narrower than necessary for the application. If full coupling does not occur from one waveguide to the other because the coupling length is not correct, excess optical loss is introduced and/or full extinction cannot be achieved, thus making the coupler unsuitable for many applications.

In response, asymmetric directional couplers have been developed in which the two waveguides have different propagation constants. The asymmetric directional coupler has been demonstrated to provide coupling over a broader wavelength band, for example in the article "Design and Fabrication of Broad-Band Silica-Based Optical Waveguide Couplers with Asymmetric Structure," by Akihiro Takagi et al. in IEEE Journal of Quantum Electronics, Vol. 28, No. 4, April 1992. Also reduced wavelength sensitivity has been demonstrated in an asymmetric coupler in electro-optic material disclosed in U.S. Pat. No. 6,842,569 by Suwat Thaniyavarn issued to Eospace Inc. Jan. 11, 2005. In this case a pair of electro-optic directional couplers having complementary asymmetry are used to reduce the wavelength sensitivity and relax manufacturing tolerance of 50/50 splitters in a Mach-Zehnder type switch or modulator. As taught by Thaniyavarn, asymmetry of the propagation constants of the directional couplers is achieved by voltage induced linear electro-optic effect, or by asymmetric waveguide widths. The former method allows the asymmetry to be tuned after fabrication of the coupler, whereas the latter method relies on tight control of fabrication processes to achieve a particular asymmetry.

Asymmetric directional couplers in electro-optic material are also demonstrated in a switch disclosed by Henning Bülow and Kurt Aretz in the Journal of Lightwave Technology, Vol. 7, No. 12, December 1989, entitled "Design and Realization of an Integrated Optic Switch for Crossbar Switching Arrays." In this article the authors describe an electro-optic 2×2 switch including a bent bridge waveguide coupled through two directional couplers between crossed input and output waveguides. Asymmetry introduced by a tapered directional coupler and waveguide width mismatch blocks coupling via the directional couplers in the no voltage cross state. "The phase constant of waveguide 2 is slightly higher than the phase constant of waveguide 1. Due to this detuning, minimum power transfer occurs within the couplers and nearly no power appears at port p3." Full switching voltage must be applied to both couplers to compensate for the asymmetry and permit light to pass into and out of the bent waveguide to drive the switch to the bar state. In this design the directional coupler asymmetry and taper geometry prevent unintentional coupling in the no voltage state. The transfer curve of input voltage versus coupling percentage has been shifted from a full coupling operation point at zero input volts to a zero coupling operation point at zero input volts. This switch design offers no change to the voltage required as compared to the prior art. Specifically, it is not suggested that an asymmetric design that shifts the operating point to partial coupling could be used to reduce switching voltage.

Directional couplers have advantages over other electro-optic devices since the close placement of the coupled waveguides permits an electric field to be effectively driven through both waveguides. This has been used to advantage in some prior art designs where two electrodes are positioned above the waveguides to be operated in push-pull operation and both waveguides are influenced by the same voltage equally but in opposite polarity. This configuration effectively reduces the required voltage by half. A push-pull directional coupler is disclosed in U.S. Pat. No. 4,820,009 by Suwat Thaniyavarn, issued to TRW Inc. on Apr. 11, 1989. This patent discloses a symmetrical directional coupler in which further reduction in voltage is achieved by including a passive Y-splitter in the structure to divide input light equally between the two waveguides in order to eliminate an electrical dc bias input. The Y-splitter is essential to this design. However, it is a very difficult structure to manufacture successfully. An error in the fabricated coupling length of the directional coupler will result in incomplete coupling that cannot be corrected by voltage. This means as discussed above, that full extinction would not be possible, and the dynamic range of the device would be limited.

Directional couplers are particularly interesting for the application as variable optical attenuators (VOA). In a VOA light input can be selectively attenuated to a desired output percentage, the remaining light being directed to the other output or into an attenuating medium.

One problem with prior art high-speed variable optical attenuators fabricated in lithium niobate is the large voltage that must be applied to the device. In typical operation, the attenuation remains constant for a long period of time. The high E-fields within the device resulting from the high voltages accelerate bias drift mechanisms, further increasing the maximum required voltage over the operational lifetime of the device. For example, if 20V is required to turn the VOA from minimum to maximum attenuation, and bias drift can cause a 2× increase in applied voltage in order to maintain the same attenuation, then the End-Of-Life (EOL) drive voltage can be as high as 40V, assuming the attenuation at Start-Of-Life (SOL) can be anywhere between the minimum and maximum value. If there is variability in the 2× bias drift multiplier, then even 40V of available drive voltage may be insufficient. Hence, reducing the SOL drive voltage to 10V or 5V greatly enhances the reliability of the VOA.

Bias drift mechanisms as discussed in U.S. Pat. Nos. 5,404,412 and 5,680,497 are due to mobile ions and space charge in the crystal and dielectric materials fabricated on top of the crystal.

An electro-optic directional coupler which overcomes the problems of the prior art, and which requires a reduced drive voltage remains highly desirable.

SUMMARY OF THE INVENTION

Accordingly, an object of the present invention is to provide an electro-optic directional coupler suitable for use as a variable optical attenuator at reduced voltages compared to those known in the prior art.

The present invention has found that by careful selection of an asymmetric directional coupler geometry, the transfer function of the device can be shifted so that it has an operating point between maximum and minimum transmission. Signal electrodes driven in push pull configuration advantageously use this operating point to achieve significant reduction in operating voltages for switching to maximum or minimum transmission. By operating point it is understood in the present application to refer to the percentage of coupling which occurs at zero applied volts in the transfer function of the device.

Thus an aspect of the present invention provides an asymmetric directional coupler formed in an electro-optic material for directing light transmitted into the directional coupler to be coupled from a first optical waveguide to a second optical waveguide at any selected optical power from full coupling to full attenuation comprising:

a first optical waveguide having a first propagation constant;

a second optical waveguide having a second propagation constant different from the first propagation constant sufficient to cause an accumulated optical phase difference between them, the first and second optical waveguides being disposed in close proximity to each other over a selected length to permit evanescent coupling between them;

a first signal electrode associated with the first optical waveguide for receiving a control voltage to determine a percentage of optical coupling between the first and second optical waveguides;

a second signal electrode associated with the second optical waveguide for receiving a control voltage approximately complementary to the first electrode control voltage for determining a percentage of optical coupling between the first and second waveguides;

wherein the length and first and second propagation constants are selected so that light is coupled from the first optical waveguide to the second optical waveguide in a percentage intermediate full coupling and full attenuation when the voltage applied to both the first and second electrodes is zero, such that less than 81% of a total switching voltage is required to switch to full coupling or to full attenuation.

In particular, the present invention provides an asymmetric directional coupler as defined above wherein substantially equal but opposite polarity electrical voltages applied to the first and second signal electrodes alters the asymmetry to determine the percentage of coupling. The first signal electrode and the second signal electrode have independent controllers for creating voltages approximately equal in magnitude but opposite in electrical polarity.

In embodiments of the invention, the asymmetry is created by forming the first optical waveguide and the second optical waveguide to have different propagation constants by a difference in: waveguide width, waveguide depth, index of refraction, or index profile.

In alternative embodiments of the invention, the asymmetry is created by mechanical stress in the first and second waveguides as a result of one or more asymmetric structures selected from: electrode positions, electrode widths and electrode thicknesses of signal and ground electrodes, number of ground electrodes, dielectric material structures and one or more etched grooves in the substrate.

The invention further provides a variable optical attenuator (VOA) for reducing optical power to any selected optical power from full transmission power to full attenuation, having reduced operating voltage comprising: an asymmetric directional coupler comprising:

a first optical waveguide and a second optical waveguide disposed in an electro-optic substrate for evanescent coupling between them;

a first signal electrode and a second signal electrode operated in an approximately push-pull configuration for creating an electronic field through the first and second optical waveguides with approximately complementary applied voltages;

wherein the first and second optical waveguides each have a different propagation constant over a substantial portion of their length selected to permit a percentage intermediate full transmission and full attenuation of optical power to couple between the first and second optical waveguides when zero voltage is applied, such that complementary voltages applied to the first and second signal electrodes change the percentage of optical power coupled to increase or decrease the percentage from the zero volts condition to couple the selected optical power.

In a further embodiment, a directional coupler is disclosed wherein a difference between propagation constants of the first and second optical waveguides varies between zero and one or more non-zero values along a length of the coupler, a net asymmetry being determined by an average difference in propagation constants along the length of the coupler.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
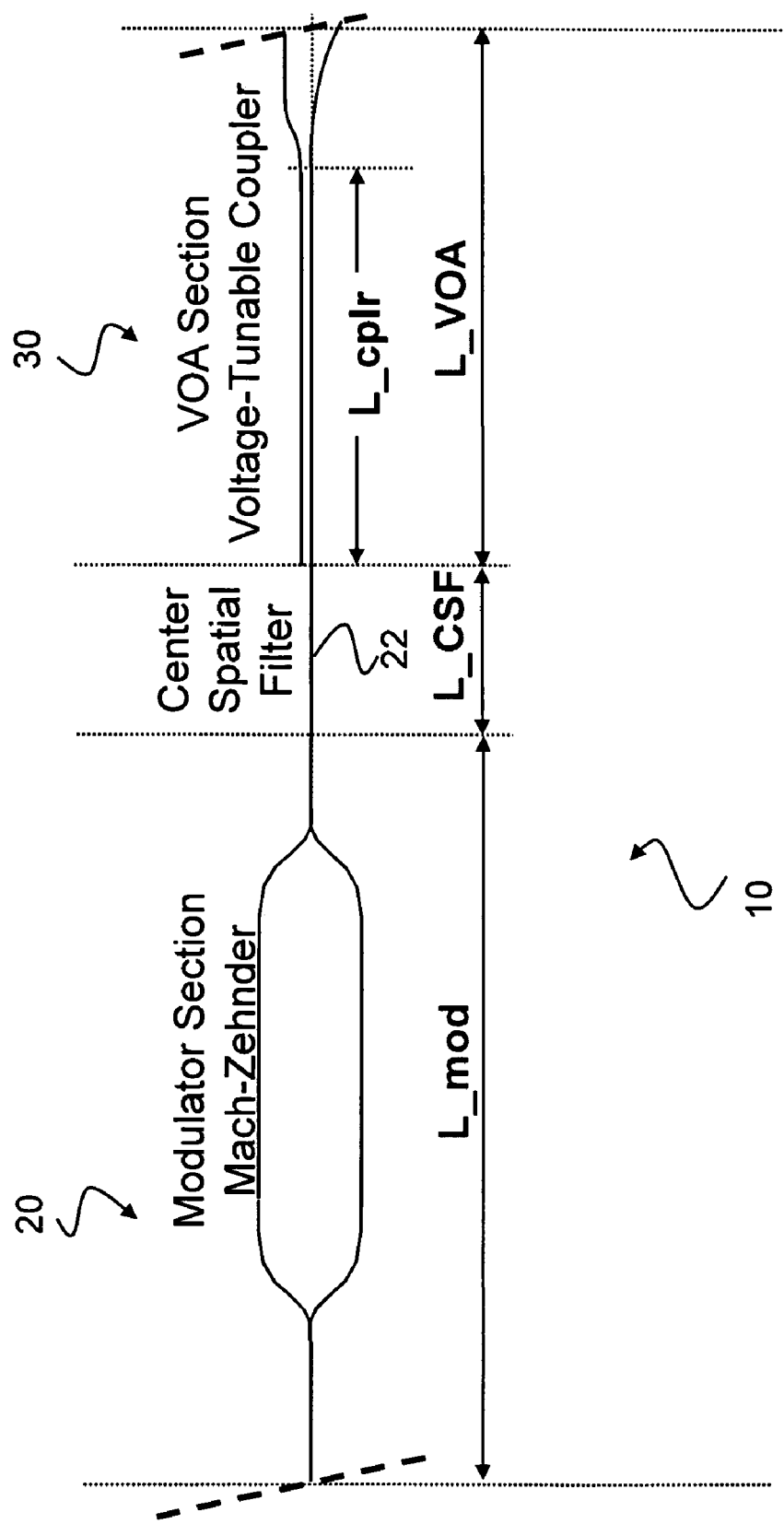
FIG. 1 is a schematic top view illustration of a channel waveguide layout for a Mach Zehnder with a variable optical attenuator.

FIG. 1 shows the waveguide layout for a modulator 10 with a data modulator 20 followed by a directional coupler VOA stage 30. The data modulator 20 is a conventional Mach-Zehnder modulator known in the art. For example, see U.S. Pat. No. 6,845,183 herein incorporated by reference. The modulator is a digital modulator suitable for data rates ranging from 10-43 Gbits or higher. Accordingly, a VOA for this application typically has an electro-optic bandwidth of at least 100 MHz, though, a bandwidth of 1-10 MHz may be adequate for many applications. The straight waveguide section 22 in between the Mach-Zehnder 20 and VOA 30 provides optical isolation of the two stages.

Figure 2:
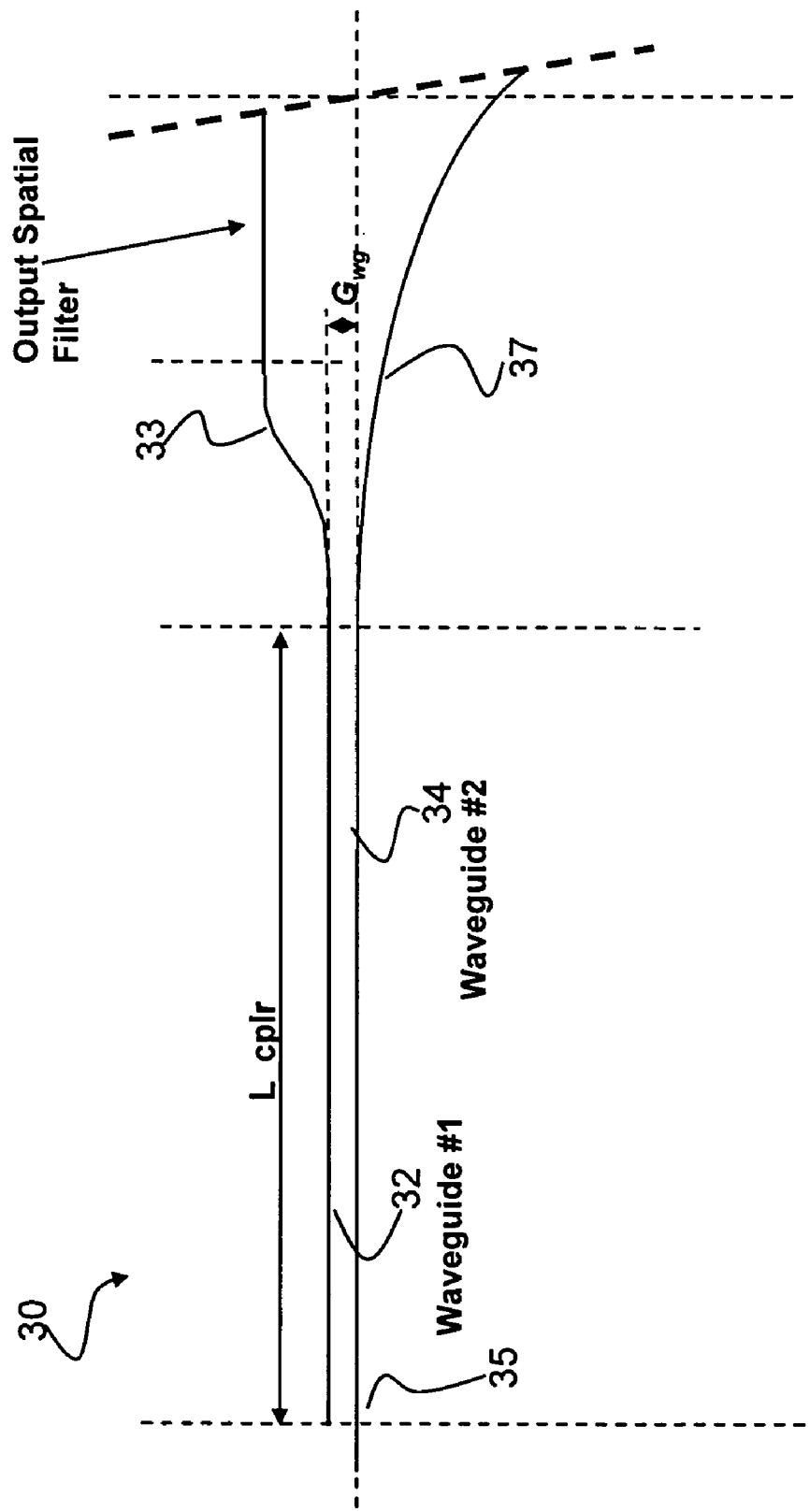
FIG. 2 is a schematic top view illustration of the VOA of FIG. 1 alone.
Figure 4:
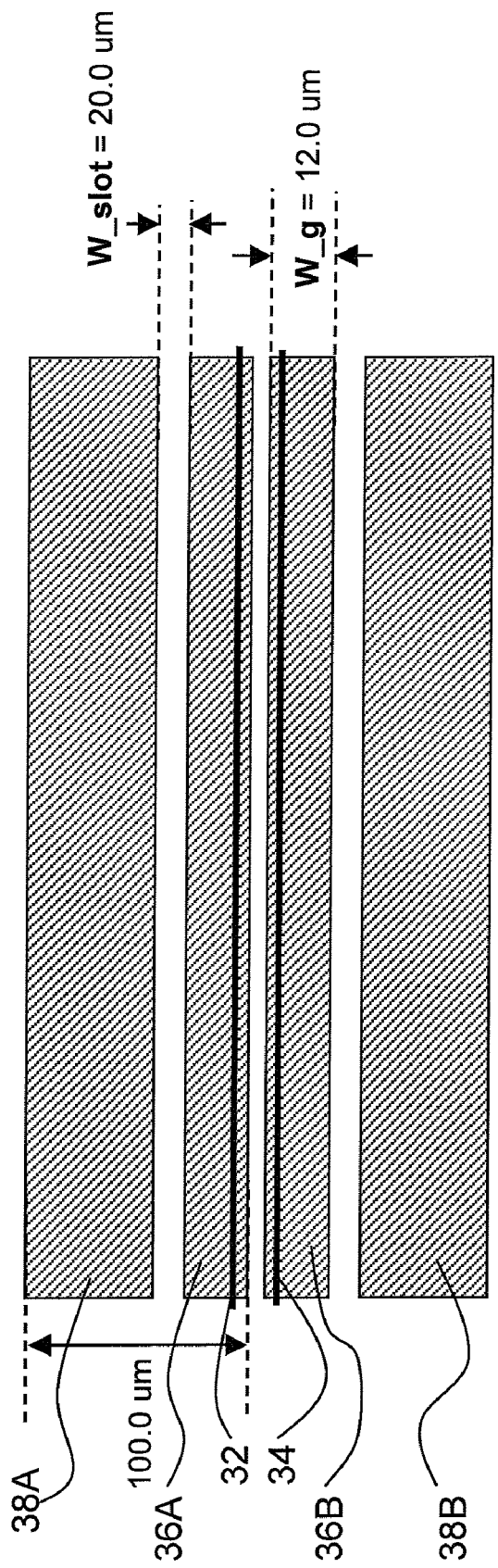
FIG. 4 is a top view of electrodes for a directional coupler in accordance with the present invention.

FIG. 2 shows a close-up of the VOA, which consists of a voltage controlled directional coupler 30. The coupler 30 comprises an electro-optic substrate 40, preferably lithium niobate, into which titanium is diffused to form waveguides 32,34. The two waveguides 32,34 are disposed in close proximity, such that power is transferred via evanescent coupling from one waveguide to the next. Light from the modulator 20 is coupled into waveguide 34 at the directional coupler input 35. Depending on the electrical signal applied, a selected percentage of light is coupled into waveguide 32 through which it exits at output 33. The unwanted percentage of light is discarded through the "dump" port 37 at the end of a large waveguide bend where it radiates harmlessly into the package containing the device. A pair of signal electrodes 36A and 36B, as seen in FIG. 4, located on top of the waveguides 32,34 change their optical propagation constants through the electro-optical effect of the substrate, resulting in a change in coupled optical power. The dimensions of a titanium strip used to create the waveguides and diffusion parameters determine the final waveguide dimensions as well as the size of the maximum index change, Δn, between the waveguide and the substrate. The maximum index change and index profile of the waveguide determine the propagation constant relative to the optical index of the substrate. A buffer layer 42, seen in FIG. 5, preferably of silicon dioxide optionally separates the waveguides 32,34 from overlying signal electrodes 36A,36B and ground electrodes 38A,38B.

One important parameter of the coupler 30 is the coupling length ($l_{cplr}$), which is the length of coupler needed to transfer 100% of the optical power at the center wavelength from one waveguide to the adjacent waveguide. Generally the waveguides 32,34 are parallel over the coupling length, or substantially parallel such that phase mis-match does not occur. Choosing the length of the coupler to be one coupling length results in the lowest drive voltage. Other choices of coupling length ($xl_{cplr}$) are possible, where total power transfer from one waveguide to the adjacent one occurs several times, but these designs will have higher switching voltage, as well as greater sensitivity of the coupled power to wavelength. Typically in prior art directional couplers full coupling occurs at zero volts of control voltage. Increased attenuation then occurs with increasing voltage magnitude, until full extinction, or minimum coupling is reached. Due to variation in fabrication process and operating wavelength, the coupling length is not exactly equal to the designed coupler length, resulting in some loss of light into the dump port 37 of the VOA. Applying voltage only increases attenuation, and hence cannot overcome this loss of optical power. Expressions such as full coupling, or 100% optical power transfer in this application disregard this unavoidable loss.

In prior art directional coupler VOA's, such as disclosed in U.S. Pat. No. 4,644,145 issued Feb. 17, 1987 to Hans M. Gundner in the name of Standard Elektrik Lorenz Aktiengesellschaft, the waveguide widths are the same for both waveguides in the coupler. In the present invention, the waveguide widths, W1, W2, as defined by the width of Ti (while both have the same thickness) that is diffused into the lithium niobate 40 to form the waveguide 32,34, are slightly different. This directional coupler 30 is referred to as an asymmetric directional coupler, due to the asymmetry in propagation constants of the two waveguides. The difference in waveguide width, ΔW (delta W), causes a difference in propagation constant, creating an accumulated difference in optical phase, Δθ (delta theta), that is as large as 2π (2 pi). The difference in width is preferably created by an increase from the nominal width for one waveguide, rather than a decrease, as an increase in width causes a smaller and more repeatable change in propagation constant and mode profile. Decreasing the width from nominal decreases confinement of the waveguide mode, causing the waveguide properties to be less repeatable. In a preferred embodiment as illustrated in FIG. 5 the Ti strips forming the waveguides are approximately 6.00 and 6.15 microns in width.

Figure 3:
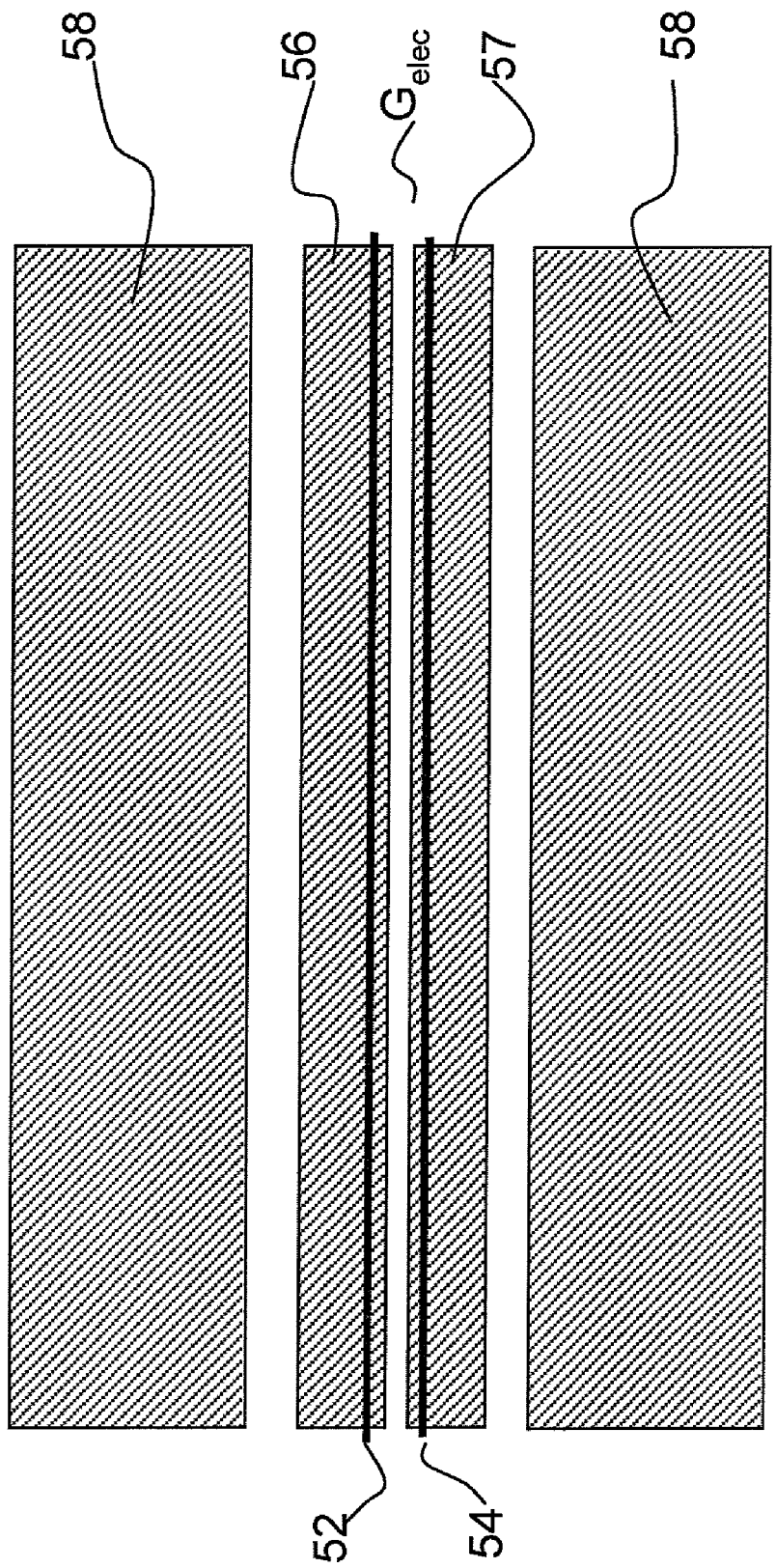
FIG. 3 is a top view illustration of a Prior Art pattern of electrodes for a VOA, and showing a portion of the underlying waveguides.

FIG. 3 shows a prior art VOA electrode structure. Each waveguide 52,54 has an electrode 56,57 on top of it. Typically, one of these electrodes 57 is grounded, while a voltage is applied to the other 56. Both electrodes 56,57 are surrounded by the shielding ground electrodes 58 as shown. The electrode gap $G_{elec}$ is centered between the waveguides 52,54.

Figure 5:
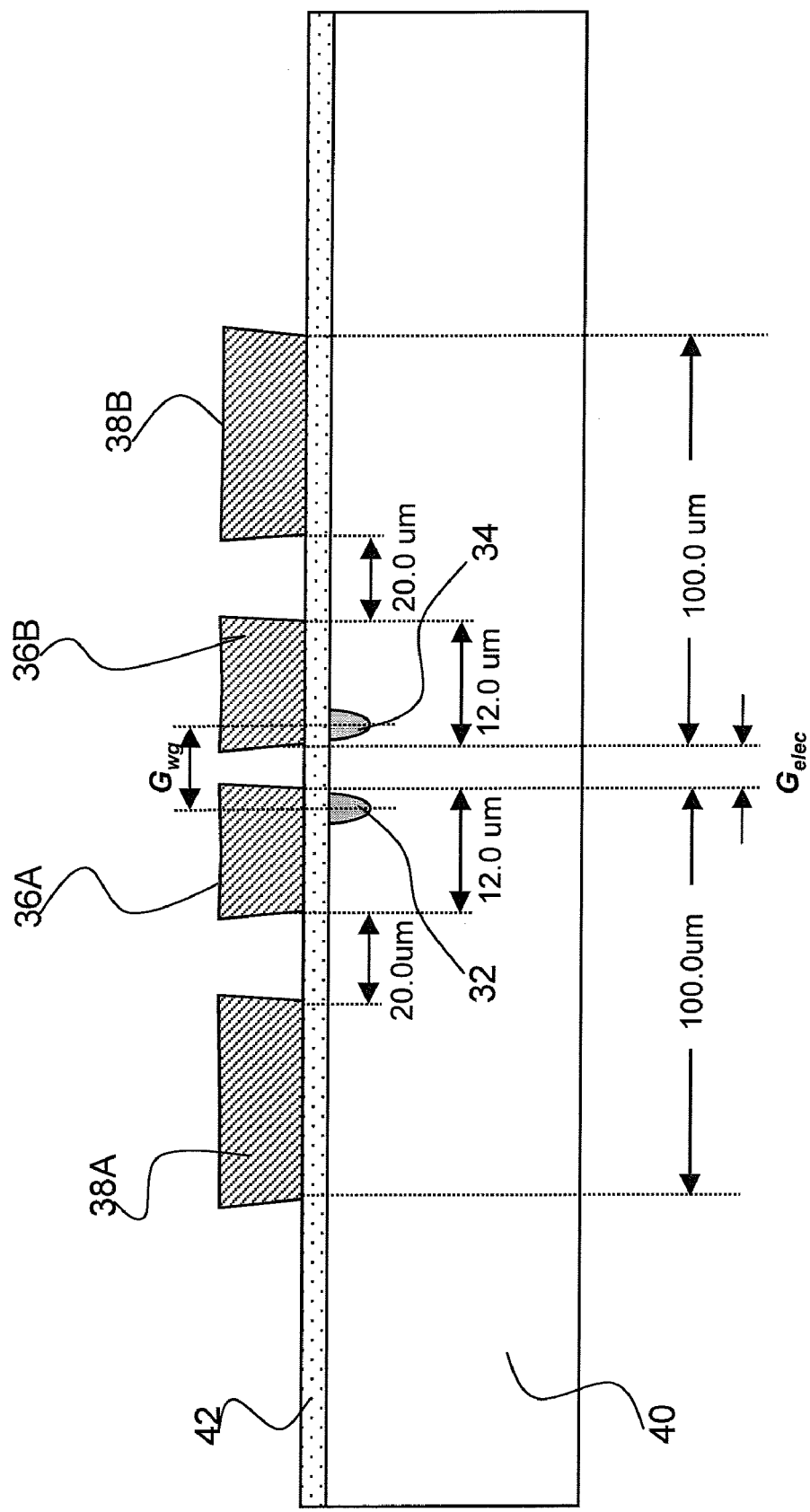
FIG. 5 is a cross-section of the directional coupler of FIG. 4 showing the electrodes and waveguides as positioned on the electro-optic substrate.

FIG. 4 shows the top view, and FIG. 5 shows a cross-section of the electrodes 36A,36B,38A,38B for the present invention. As in the prior art, the electrode gap $G_{elec}$ between the electrodes 36A,36B is chosen to be as small as possible, preferably 6 microns or less. Again the electrode gap $G_{elec}$ is centered between the waveguides 32,34. Unlike the prior art, both of the inner signal electrodes 36A,36B that are over waveguides receive an applied voltage. The voltages are applied in a push-pull fashion, causing a reduction of the required voltage by a factor of two. Hence, the invention requires two applied voltages instead of one, but the required voltage is cut in half. The voltages applied are complementary or approximately complementary to effect the desired phase change. Small differences in voltage magnitude to each of the signal electrodes 36A,36B can be used to alter the coupling control. This approach is similar to dual-drive electrode used in Mach-Zehnders, for example, see FIG. 18A of U.S. Pat. No. 5,074,631. The E-field in the waveguide is roughly the same whether one or two voltages are used to control the coupler. Hence, bias drift mechanisms related to the strength of the E-field will be the same. Further voltage reduction is noted by driving the two inner electrodes 36A,36B push-pull with the outer electrodes 38A,38B grounded resulting in an additional 5% reduction of drive voltage compared to the case where each outer electrode is connected to the closest inner electrode. Grounding the outer electrodes results in a more vertical E-field, producing better alignment of the applied field with the electro-optically active z-axis of the lithium niobate crystal. The better alignment improves the electro-optic efficiency, reducing the drive voltage by 5%.

Figure 6:
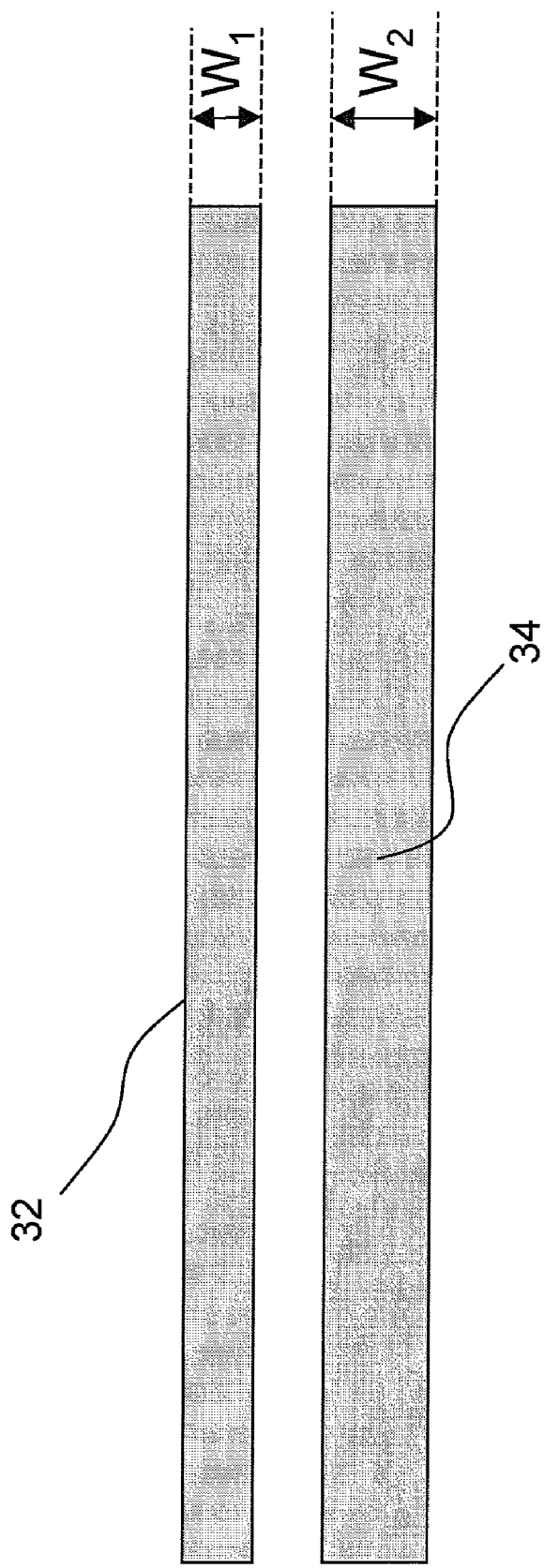
FIG. 6 is an enlarged view of the waveguides of FIG. 4 showing the waveguide widths in closer detail.
Figure 7:
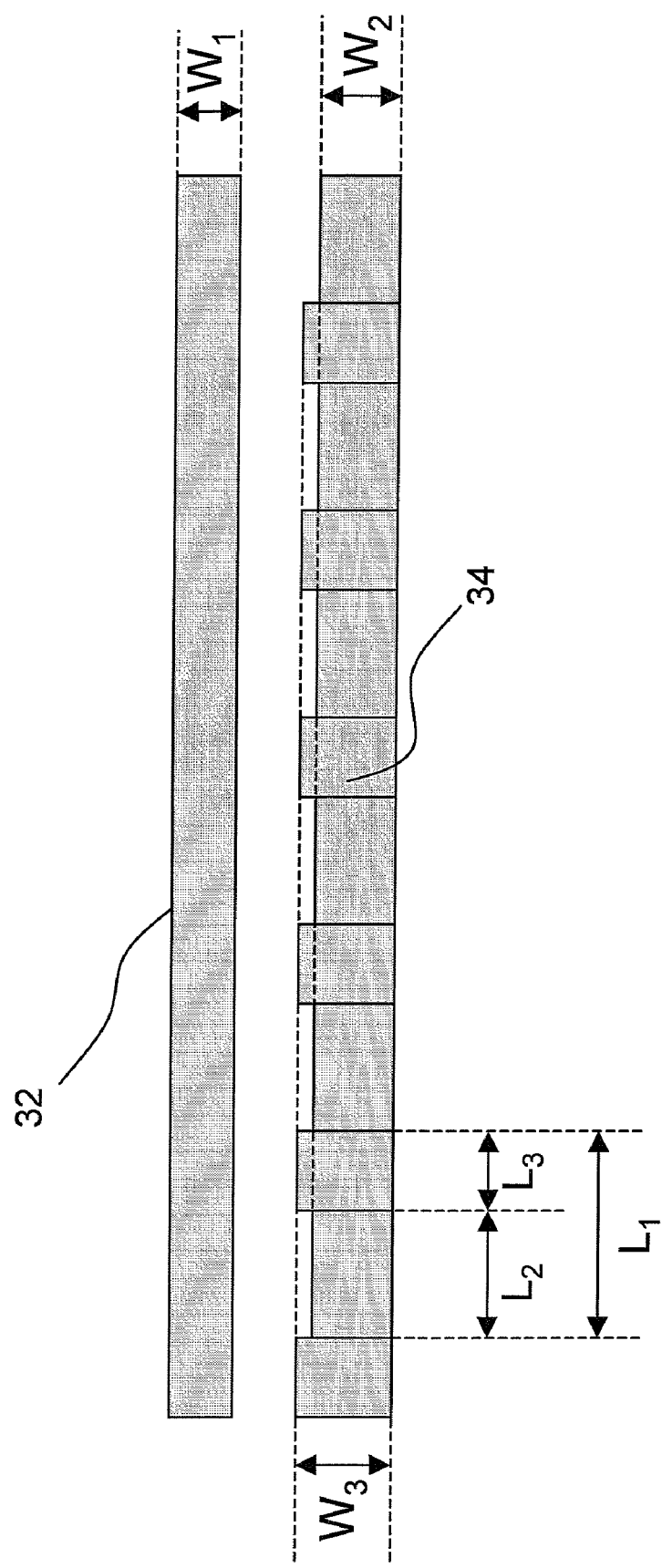
FIG. 7 is an enlarged view of the waveguides of FIG. 4 showing the waveguide widths in closer detail for an alternative embodiment where waveguide width varies between two widths in one of the waveguides.

FIGS. 6 and 7 show enlarged views of the patterned Ti strips used to make the waveguides of FIG. 4 in a lithium niobate substrate. FIG. 6 shows waveguides 32 and 34 having fixed widths, $W_1$ and $W_2$, respectively, along their length, while FIG. 7 shows waveguide 32 having fixed width $W_1$ and waveguide 34 having a width that varies periodically between $W_2$ and $W_3$. Either waveguide can have the fixed width, and both waveguides can have varying widths as long as the mean width of one waveguide is different from the other. One problem that can arise with reducing the invention to practice is that the desired difference between waveguide widths is too small, or is not a multiple of the smallest available resolution and/or grid size for photolithography used to fabricate the coupler. For example, if the available resolution is 0.10 micron, and the desired waveguide width difference is 0.15 micron, then the fabricated waveguide width will either be too small (0.10 micron) or too large (0.20 micron). The design shown in FIG. 7 removes the limitation of photolithographic resolution by allowing the propagation constant to be continuously varied between the propagation constants corresponding to available waveguide widths. The periodic width variation shown in FIG. 7 has some similarity to the segmented waveguide described by Z. Weissman and A. Hardy in the Journal of Lightwave Technology, Vol. 11, No. 11, November 1993, entitled "Modes of Periodically Segmented Waveguides." FIG. 10 in that article shows an asymmetric coupler created by a segmented waveguide with one width next to another waveguide having a different width. The segmentation allows for more control of index change and propagation constant difference. In FIG. 7, the waveguide is not segmented, but varies periodically a small amount in width. The propagation constant difference between the two waveguides of the coupler in FIG. 7 is likely to be much smaller than the propagation constant difference created by the design shown in FIG. 10 of the aforementioned article.

The net propagation constant, $B_{net}$ for waveguide 34 will be a weighted average of the propagation constants $B_2$ and $B_3$ which correspond to widths $W_2$ and $W_3$, respectively, according to the following formula:

$$B_{net} = \frac{L_2 B_2 + L_3 B_3}{L_2 + L_3}$$

Note that the width of waveguide 34 remains at width $W_2$ for length $L_2$ and at width $W_3$ for length $L_3$. The total length of the repeated section is $L_1=L_2+L_3$ which is typically 5 to 50 microns. The length $L_1$ must be short enough to prevent the waveguide propagation constant from varying substantially along that length. For example, if length $L_1$ were to be several millimeters, then the waveguide mode would have sufficient length along $L_2$ or $L_3$ to evolve to the modal solutions that correspond to propagation constants $B_2$ or $B_3$. The difference in propagation constants between waveguide 32 and 34 would vary with distance along the coupler. An applied voltage could cancel out the difference between propagation constants along length $L_1$ or along the length $L_2$, but never both. The residual difference in propagation constants that would remain along sections of the coupler would prevent 100% transmission from being achieved, resulting in excess optical loss.

Note that other waveguide width combinations are possible. Waveguide width $W_2$ could equal $W_1$, if the desired waveguide width difference is smaller than the available resolution. For example, if desired waveguide width difference is 0.05 microns and the available photolithographic resolution is 0.10 microns. In principle, more than two widths along waveguide 34 could be used, though, there is little advantage to do so. The waveguide width variation could also be aperiodic instead of periodic. In a case where there are multiple widths and/or aperiodic variation along the length of the coupler, the following more general equation defines the propagation constant.

$$B_{net} = \frac{\int_{Zstart}^{Zfinal} B(z)\,dz}{Zfinal - Zstart}$$

Where $B_{net}$ is simply the mean propagation constant integrated over some length of the waveguide from Zstart to Zfinal, where the difference between Zstart and Zfinal is at least approximately 100 microns or more. The waveguide width as a function of length, W(z), must be chosen such that the mean value for $B_{net}$ integrated from the one end of the coupler to the other approximately equals the mean value found for any small section of the coupler having a length of about 100 microns or more. If both waveguides have a width that varies over the length of the coupler, then this equation must be applied to each waveguide, and the difference between the two mean propagation constants multiplied by the length of the coupler will determine the net accumulated optical phase $\Delta\theta$ (delta theta).

The signal electrodes 36A,36B of the invention are chosen to be about 10 to 15 microns, preferably 12 microns, and the gap between these electrodes and the surrounding ground electrodes 38A,38B is at least 20 microns. These choices minimize stress created by the electrodes, as taught in U.S. Pat. No. 6,845,183. Any differential stress due to electrode misalignment with the waveguide creates a small index change difference via the piezoelectric and electro-optic effect, as well as the elasto-optic effect, as taught in U.S. Pat. No. 6,845,183. The small index change difference causes a difference in propagation constant, and therefore an accumulated optical phase difference, $\Delta\theta$ (delta theta), much in the same way as was accomplished with the difference in waveguide width. This can be used as another means to create an asymmetric propagation constant. By creating an intentional electrode offset with respect to the waveguides a difference in optical phase between the two waveguides is obtained.

The electrode offset is more difficult to control than the difference in waveguide width. The electrode-waveguide alignment has some variability due to irreversible distortion of the wafer during waveguide fabrication, as well as alignment error introduced during photolithography. The Δθ (delta theta) from electrode offset can also change with temperature. A design having signal electrodes with different width, thickness, or made of different material will also result in a differential stress and non-zero Δθ (delta theta) Proper choice of geometry and materials is necessary to obtain a differential stress that is constant for different temperatures.

Another disadvantage of using an electrode offset to create Δθ (delta theta) is the reduction of overlap between applied field and optical for one of the waveguides, causing an increase in the control voltage needed to turn the VOA from minimum to maximum attenuation. This increase in control voltage reduces some of the voltage reduction gained by shifting the VOA transfer function.

Figure 8:
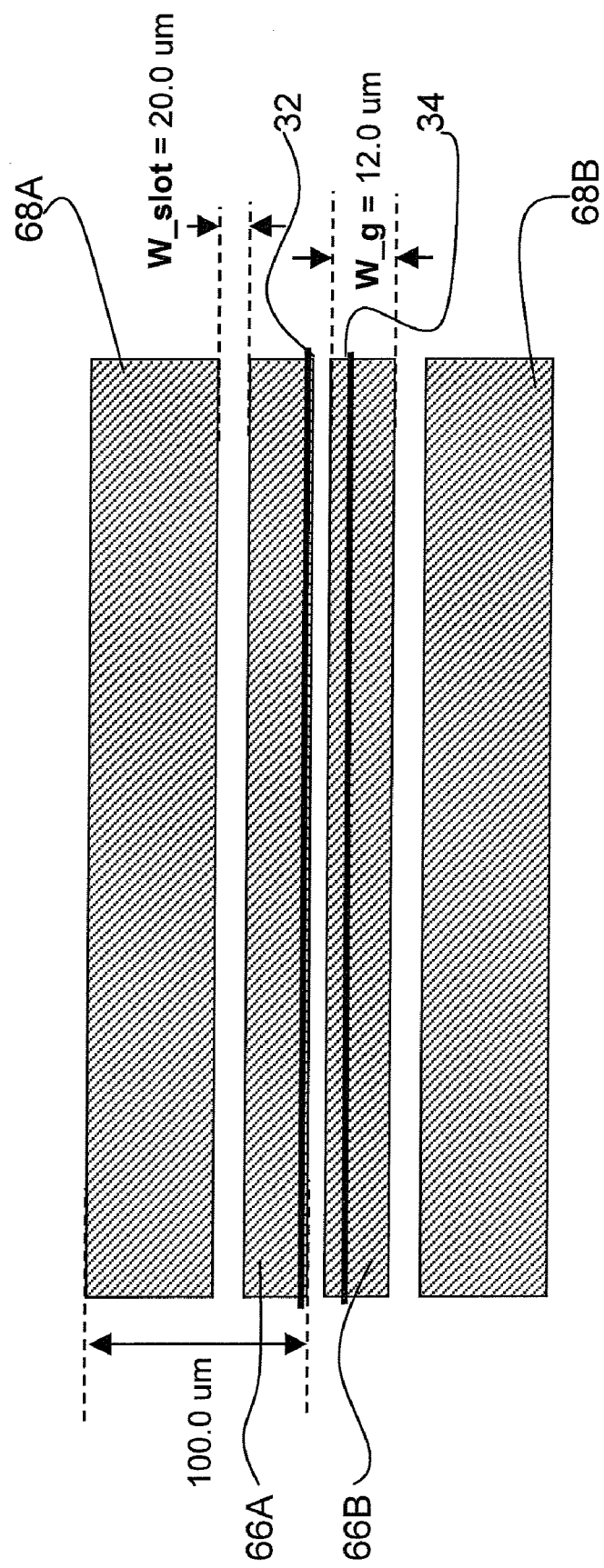
FIG. 8 is an alternate embodiment of the present invention illustrating an electrode offset with respect to the waveguides for creating a difference in propagation constants.
Figure 9:
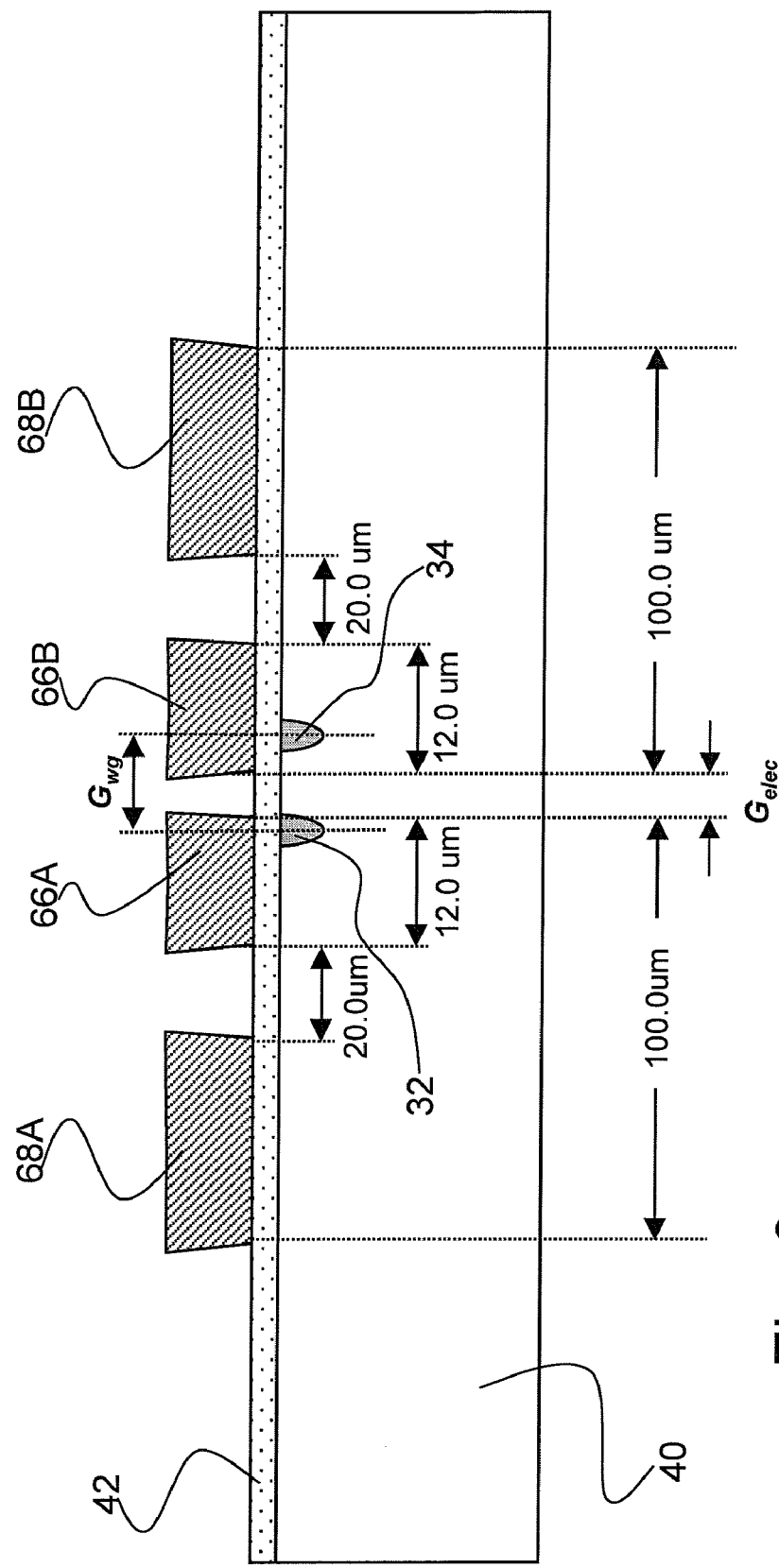
FIG. 9 is a cross-section of the embodiment of FIG. 8.
Figure 10:
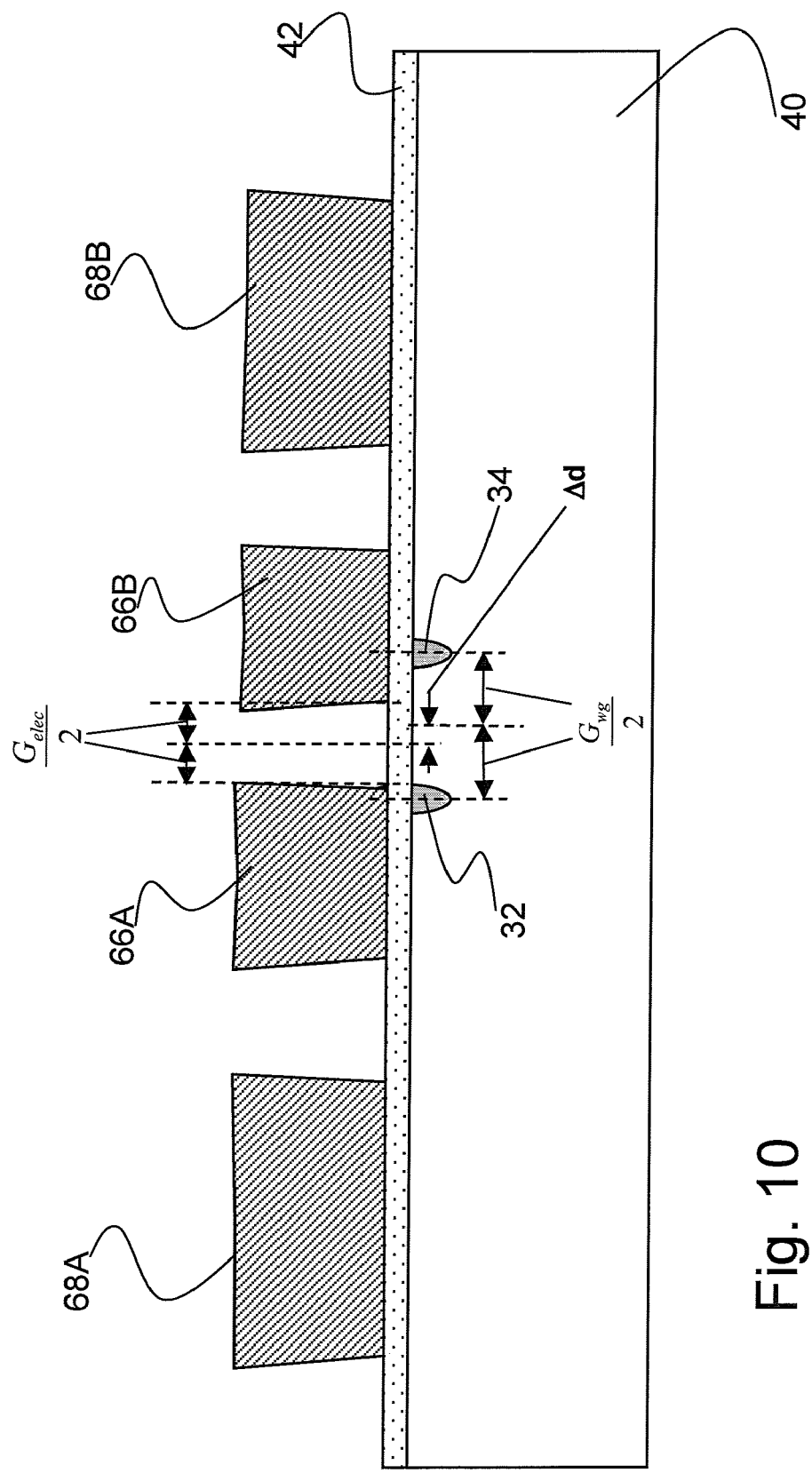
FIG. 10 is an enlarged view of the cross-section of FIG. 9 showing the electrode offset in closer detail.

FIG. 8 shows a top view and FIGS. 9-10 show cross sections of electrodes 66A,66B,68A,68B similar to electrodes 36A,36B,38A,38B shown in FIGS. 4 and 5, however the electrodes 66A,66B,68A,68B are intentionally offset by Δd (delta d) to cause an asymmetry of the electrode location, relative to the waveguide beneath it. The electrode gap $G_{elec}$ in this embodiment is not centered between the waveguides.

Additional methods of creating a propagation constant differential via mechanical stress include varying the width or the thickness of the electrodes 66A,66B along some portion or all of the length of the VOA. Alternatively, different dielectric material(s) or dielectric structures can be formed on top of each of the two waveguides, along some or all of the VOA. This dielectric can be a portion of the buffer layer 42, or —one or more additional materials between the buffer layer 42 and one or both of the waveguides 32,34, or between the buffer layer 42 and one or more of the electrodes 66A,66B,68A, 68B. Alternatively, one or more grooves etched in the substrate can be used to create mechanical stress. For instance the number of grooves, position of the grooves, width or depth of grooves can all be selected to create an asymmetric structure having the desired propagation constant differential. Any of the structures mentioned above can be combined to create the necessary mechanical stress.

Figure 11:
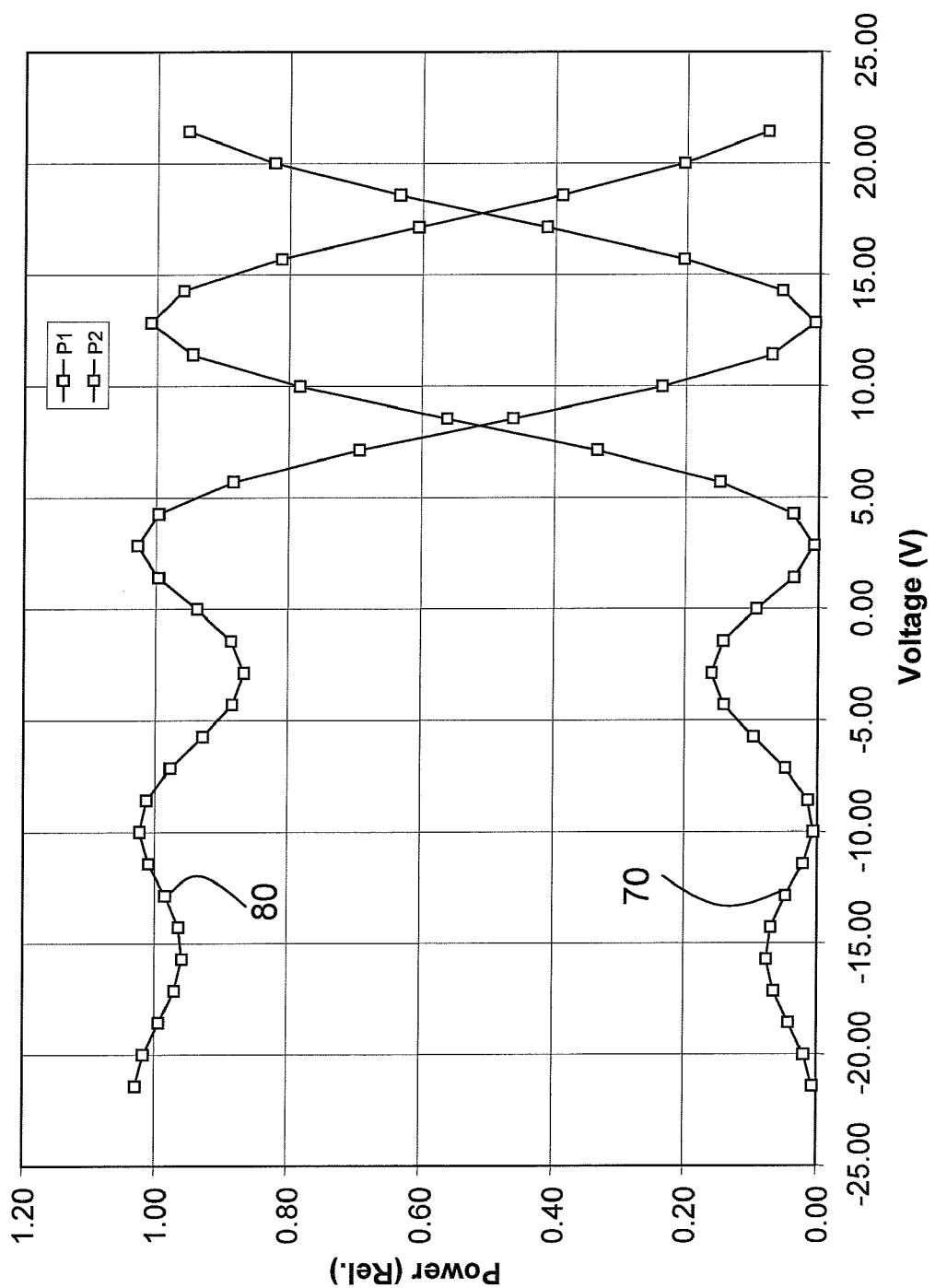
FIG. 11 is a graphic illustration of a transfer curve for a VOA in accordance with the present invention in which a ΔW (delta W) of −0.2 microns demonstrates a shift in transfer curve of approximately +13 volts.
Figure 12:
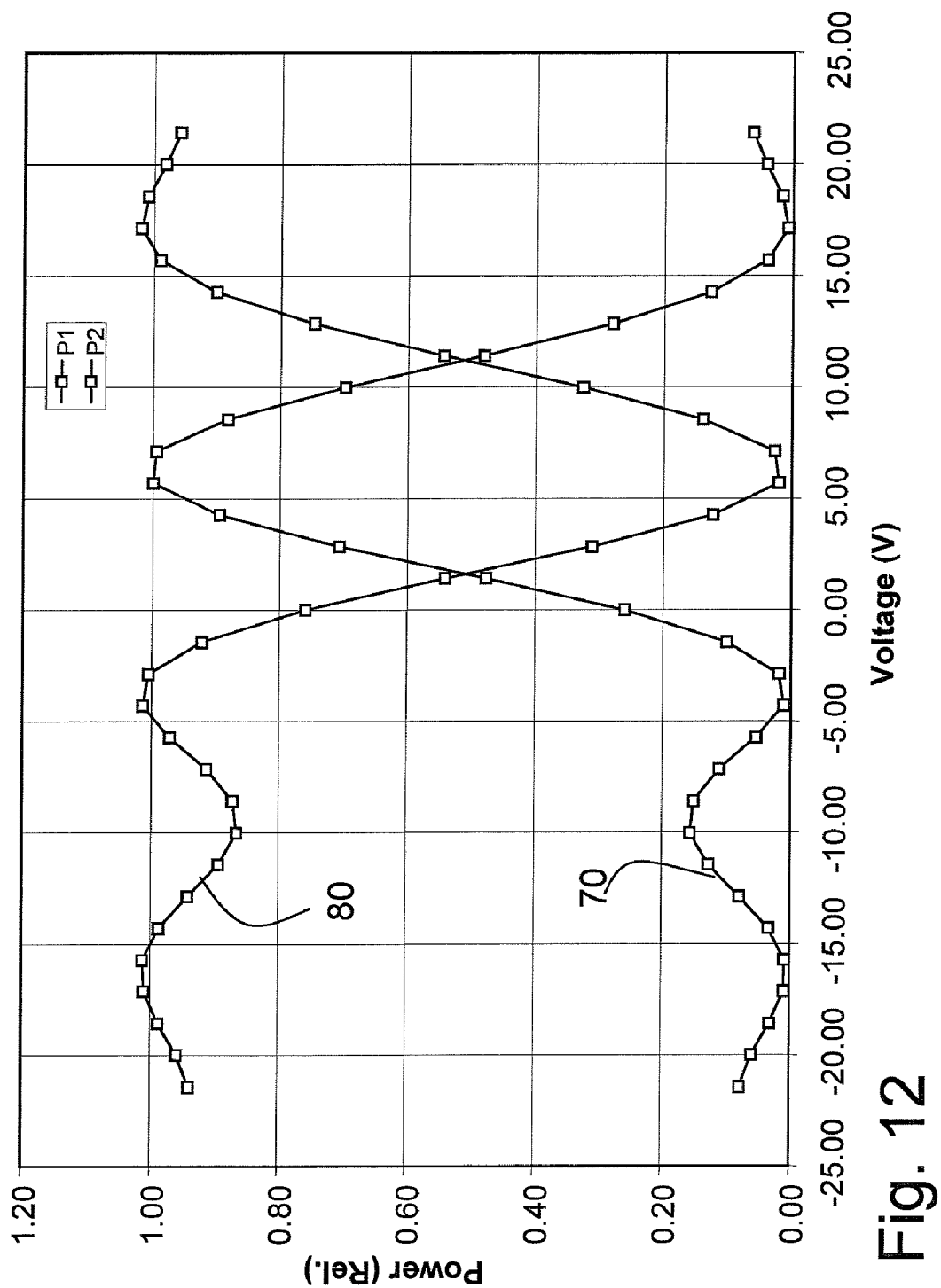
FIG. 12 is a graphic illustration of a transfer curve for a VOA in accordance with the present invention in which a ΔW (delta W) of −0.1 microns demonstrates a shift in transfer curve of approximately +6 volts.
Figure 13:
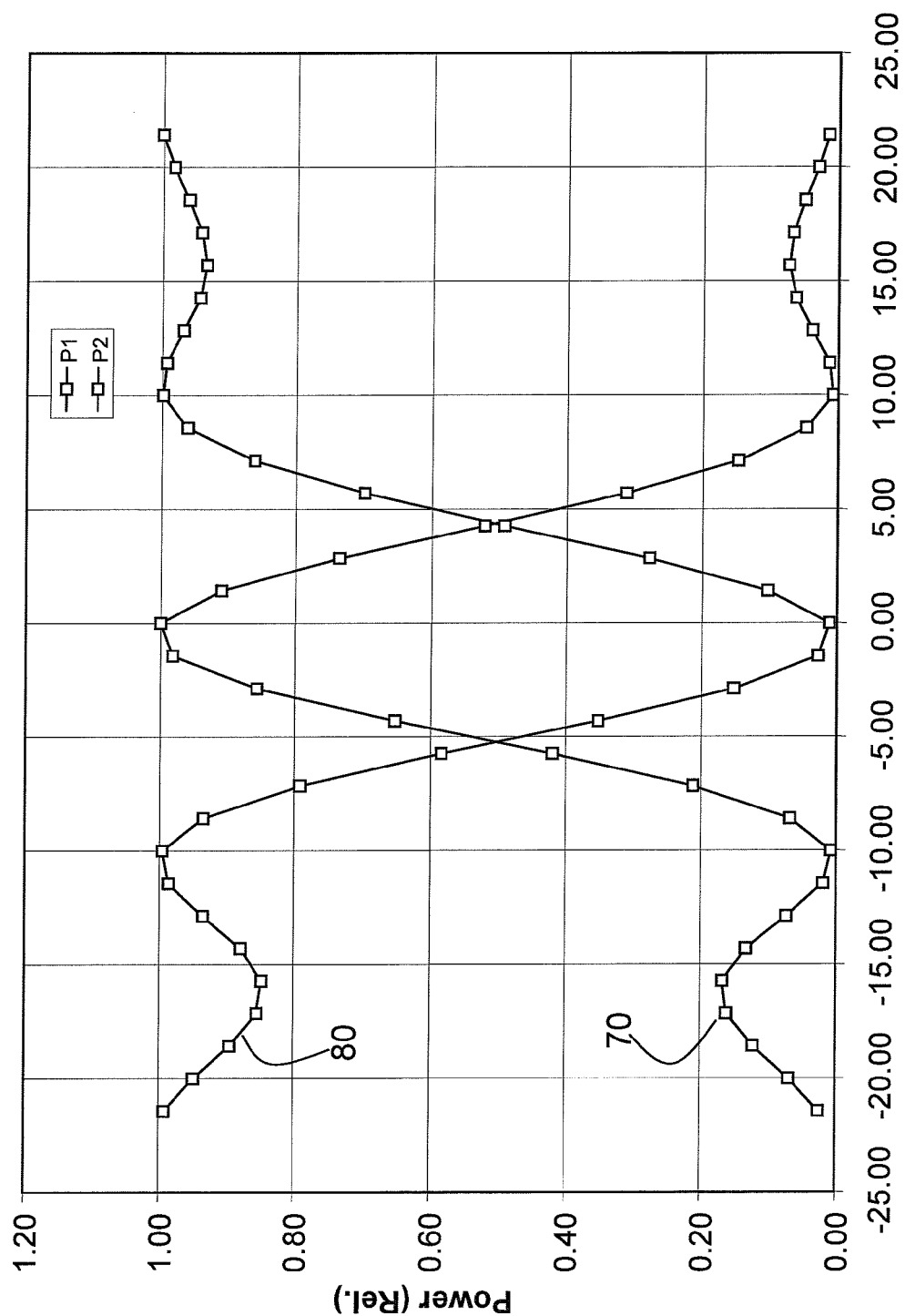
FIG. 13 is a graphic illustration of a transfer curve for a Prior Art symmetric directional coupler VOA.
Figure 14:
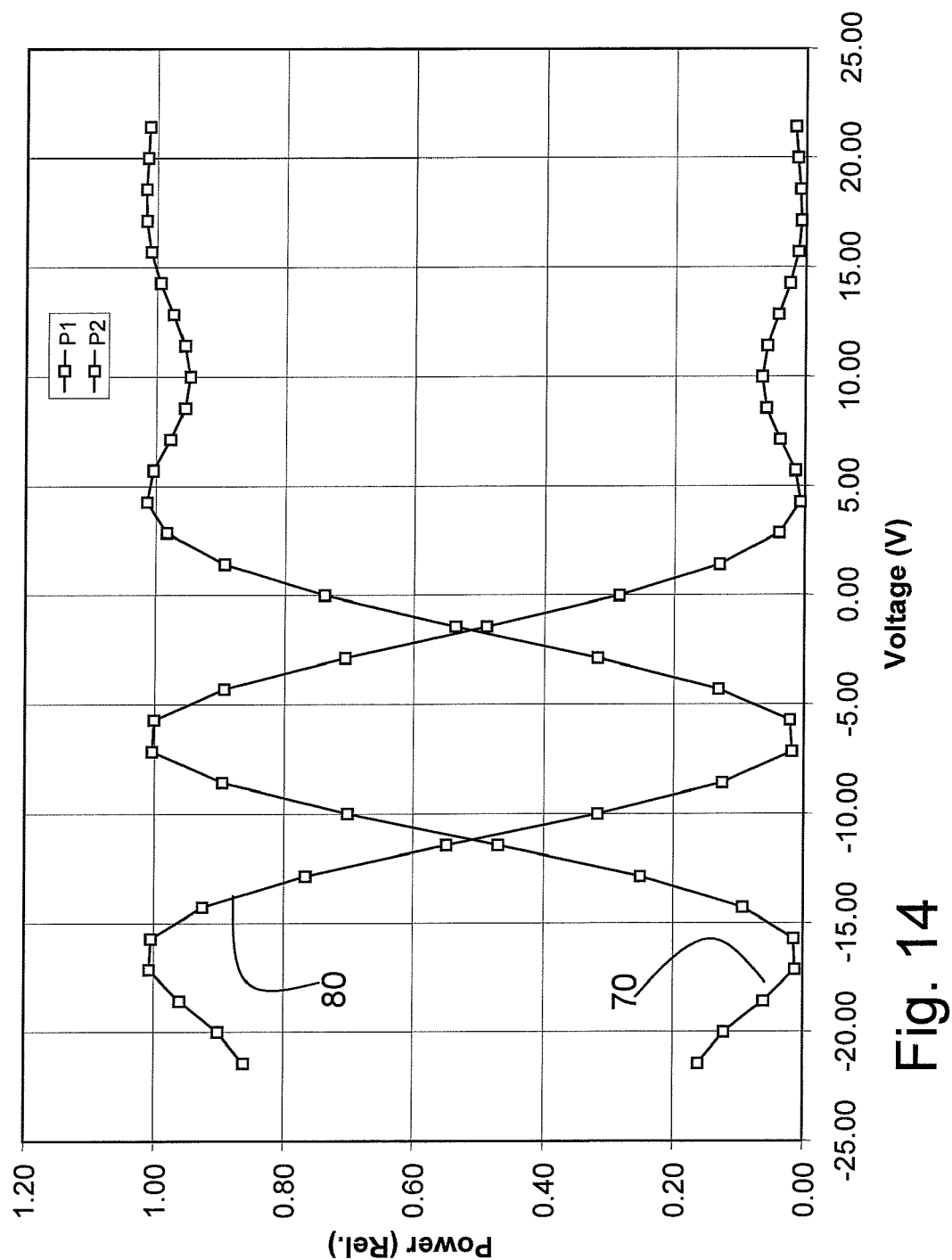
FIG. 14 is a graphic illustration of a transfer curve for a VOA in accordance with the present invention in which a ΔW (delta W) of +0.1 microns demonstrates a shift in transfer curve of approximately −7 volts; and, FIG. 15 is a graphic illustration of a transfer curve for a VOA in accordance with the present invention in which a ΔW (delta W) of +0.2 microns demonstrates a shift in transfer curve of approximately −13 volts.
Figure 15:
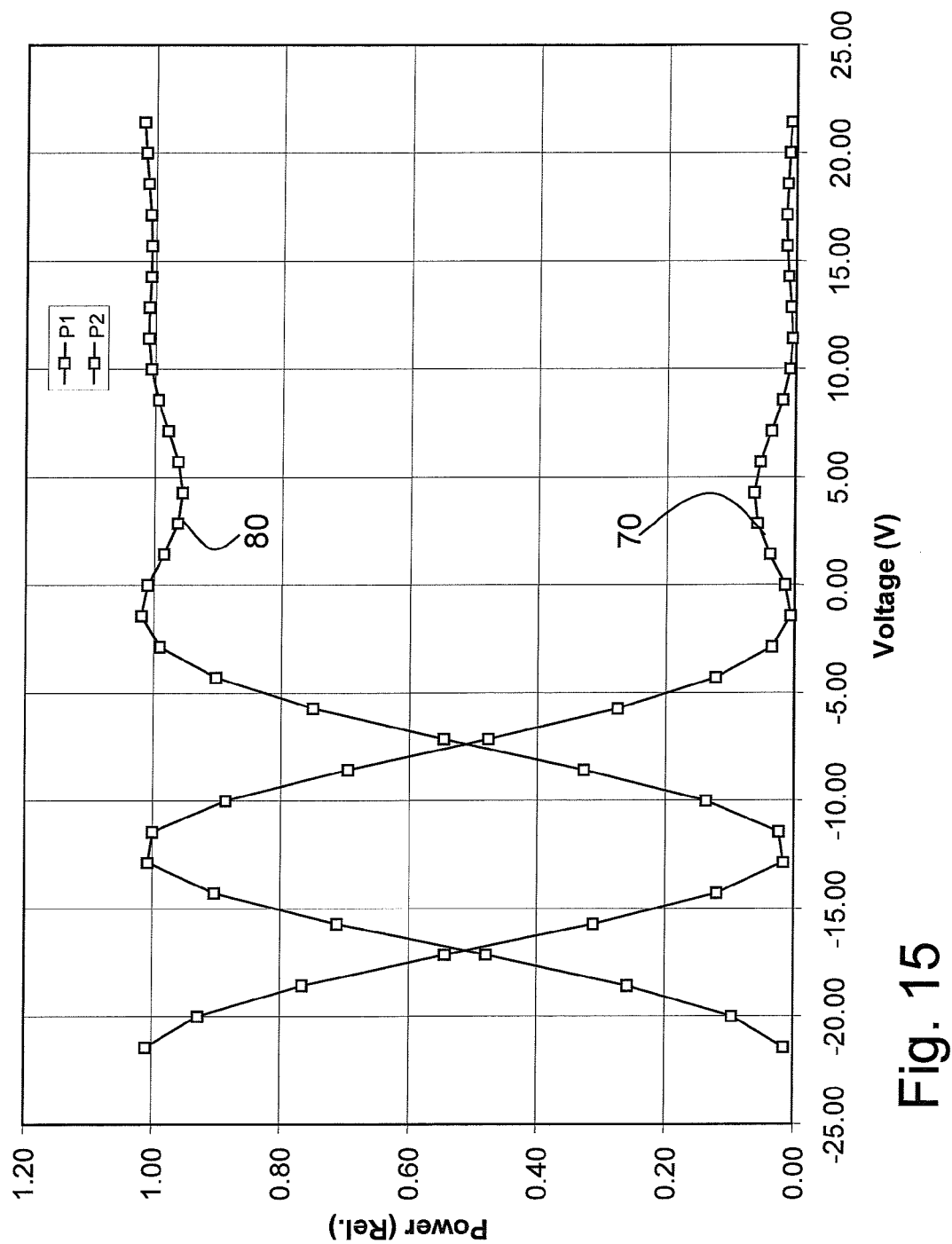

FIGS. 11-15 show the fraction of light transmitted through the VOA to output 33 as a function of voltage applied to signal electrode 36A. This curve 70 is often called the transfer function of the VOA. Curve 80 shows the fraction of light transmitted to the dump port 37 of the VOA. Note that the voltage applied to signal electrode 36B is in this case, simply the negative of the value applied to electrode 36A. FIGS. 11, 12, 13, 14, and 15 show the transfer function for ΔW (delta W), where ΔW (delta W) is the difference in waveguide width. The quantity ΔW (delta W) varies from –0.2 μm (microns) to 0.2 μm (microns) in those plots. FIG. 13, where ΔW (delta W) equals zero, shows the transfer function for Prior Art high-speed VOA's, where the maximum power transmitted occurs when zero volts is applied to the signal electrodes.

The transfer curves shown in FIGS. 11-15 are valid for couplers at the Beginning-of-Life (BOL), before any DC voltages have been applied to the electrodes over a long period of time. During the operation lifetime of the coupler, the transfer curve may shift due to accumulated space charge in the buffer layer and/or substrate, causing the applied electric field to be strengthened, or more typically, weakened, requiring a smaller or larger DC voltage to be applied as time passes. A control circuit typically adjusts the applied voltage to compensate for changes in the transfer curve resulting from the accumulation of space charge.

Looking at the transfer function of FIG. 11 in detail, it can be seen that for this asymmetry with a ΔW (delta W) of –0.2 microns, the transfer curve has been shifted by about +13 volts, as compared to the Prior Art shown in FIG. 13. Since the transmission at zero applied volts is not between the minimum and maximum attenuation, there is no reduction in applied voltage to be obtained from this geometry.

The transfer curve of FIG. 12 however, shows a transfer curve shifted approximately +6 volts. In this geometry with an asymmetry of ΔW (delta W) of –0.1 microns, a transmission of approximately 30% occurs at zero applied volts, and the applied voltage is about –4 volts to full attenuation, and +6 volts to full transmission. This is a significant reduction to the 10 volts necessary to switch the prior art device as shown in FIG. 13. Reverse but equal results are displayed in FIGS. 14 and 15 to those in FIGS. 11 and 12.

For a small but non-zero ΔW (delta W), the waveguide propagation constants are slightly different, causing the accumulated optical phase difference, Δθ (delta theta), between the waveguides 32,34. This phase difference acts as a bias for the transfer function. For example, if Δθ=0.85π, and a phase difference of 1.7π is required to switch the VOA from minimum to maximum transmission, then the attenuation is midway between maximum and minimum attenuation with zero volts applied. Applying a voltage to the signal electrodes 36A,36B such that the electro-optically induced phase difference, $Δθ_{eo}$, is opposite and equal in magnitude to Δθ, removes any net optical phase difference, resulting in minimum attenuation. On the other hand, if $Δθ_{eo}$=0.85π, and has the same sign as Δθ, a net phase of 1.7π accumulates resulting in maximum attenuation.

Note that $Δθ_{eo}$=±0.85π at attenuation maximum and minimum, instead of 0 and 1.7π, hence the required voltage is ±5V instead of 0 and 10V. Hence, biasing of the VOA transfer function with Δθ reduces drive voltage by approximately 2×.

For prior art high-speed VOA's, minimum attenuation occurs when zero volts is applied and maximum attenuation occurs with about 20V applied. If a push-pull electrode configuration is used, the required voltage is reduced to ±10V. In the present invention, propagation constant difference introduced by the waveguide width difference, ΔW (delta W), and/or electrode offset, Δd (delta d), or other means, is introduced to move the transfer curve by about 5V, or one half the switching voltage needed to turn the VOA from minimum to maximum attenuation. With the shifted transfer curve, only +5V is required to turn the VOA from minimum to maximum attenuation. The attenuation with zero volts applied can be tailored for different applications. For instance, a set point at zero volts can be set approximately at a mid point of a select operation range which may be only a circumscribed portion of the full device range, for instance 1 dB to 20 dB (80% to 1% transmitted light).

It is not always possible to establish the operating point at the mid point of the transmission range. As long as the transfer function from maximum to minimum transfer traverses the zero voltage point, a reduction in required voltage can be obtained. A useful minimum can be expressed, if the optical power transfer is greater than 10% and less than 90% at zero applied volts, then the magnitude of the voltage required to switch to 0% or to 100% optical power transfer is 81% of the switching voltage or less, and a worthwhile reduction in voltage is achieved.

The embodiments of the invention described above are intended to be exemplary only. The scope of the invention is therefore intended to be limited solely by the scope of the appended claims.

What is claimed is:

1. An asymmetric directional coupler formed in an electro-optic material for directing light transmitted into the directional coupler to be coupled from a first optical waveguide to a second optical waveguide at any selected optical power from full coupling to full attenuation comprising:
a first optical waveguide having a first propagation constant;
a second optical waveguide having a second propagation constant different from the first propagation constant sufficient to cause an accumulated optical phase difference between them;
the first and second optical waveguides being disposed in close proximity to each other over a selected length to permit evanescent coupling between them;
a first signal electrode associated with the first optical waveguide for receiving a control voltage to determine a percentage of optical coupling between the first and second optical waveguides;
a second signal electrode associated with the second optical waveguide for receiving a control voltage approximately complementary to the first electrode control voltage for determining a percentage of optical coupling between the first and second waveguides;
wherein the length and first and second propagation constants are selected so that light is coupled from the first optical waveguide to the second optical waveguide in a percentage between full coupling and full attenuation when the voltage applied to both the first and second electrodes is zero, such that less than 81% of a total switching voltage is required to switch to full coupling or to full attenuation.

2. An asymmetric directional coupler as defined in claim 1, wherein the first signal electrode and the second signal electrode have independent controllers for creating voltages approximately equal in magnitude but opposite in electrical polarity.

3. An asymmetric directional coupler as defined in claim 2 wherein the directional coupler comprises a variable optical attenuator (VOA) for controlling optical output power to any selected percentage of an operating range including electrode controllers adapted to provide complementary voltages to create any selected percentage of optical coupling.

4. An asymmetric directional coupler as defined in claim 3, wherein the operating range of optical power is a select range less than the total input power, and wherein the operating point is selected to be intermediate the select range such that less than 81% of the total switching voltage is required to obtain a minimum or maximum of the select range.

5. An asymmetric directional coupler as defined in claim 3 where the VOA is formed on lithium niobate substrate as an integrated device with a Mach Zehnder interferometer, and wherein the first optical waveguide is optically coupled to an output of the integrated MZ.

6. An asymmetric directional coupler as defined in claim 2 further comprising at least one ground electrode at mid-potential of the first and second signal electrodes to reduce the required voltage.

7. An asymmetric directional coupler as defined in claim 1 wherein the first waveguide and the second waveguide are substantially parallel over a coupling length at a center wavelength.

8. An asymmetric directional coupler as defined in claim 1, wherein the first optical waveguide has a first optical output and the second optical waveguide has a second optical output and the control voltages to the first and second signal electrodes determine the ratio of optical power output from the first and second optical outputs.

9. An asymmetric directional coupler as defined in claim 1 wherein the asymmetry is created by forming the first optical waveguide and the second optical waveguide to have different propagation constants by a difference in: waveguide width, waveguide depth, index of refraction, or index profile.

10. An asymmetric directional coupler as defined in claim 1 wherein the asymmetry is created by an asymmetric position of the first and second signal electrodes relative to the first and second waveguides.

11. An asymmetric directional coupler as defined in claim 1 wherein the asymmetry is created by the first and second electrodes having different widths.

12. An asymmetric coupler as defined in claim 1 wherein the asymmetry is created by a first buffer material structure between the electro-optic material and the first signal electrode and a second different buffer material structure between the electro-optic material and the second signal electrode.

13. An asymmetric directional coupler as defined in claim 1 wherein the asymmetry is created by causing different mechanical stress in the first and second waveguides.

14. An asymmetric directional coupler as defined in claim 13, wherein the mechanical stress differential is created by one or more asymmetric structures selected from: electrode positions; electrode widths and electrode thicknesses of signal and ground electrodes; number of ground electrodes; dielectric material structures, and one or more etched grooves in the substrate.

* * * * *